April 22, 1952  G. F. FEARFIELD ET AL  2,593,664
APPARATUS FOR LIFTING AND TRANSPORTING WHEELED VEHICLES
Filed Dec. 21, 1949  2 SHEETS—SHEET 1
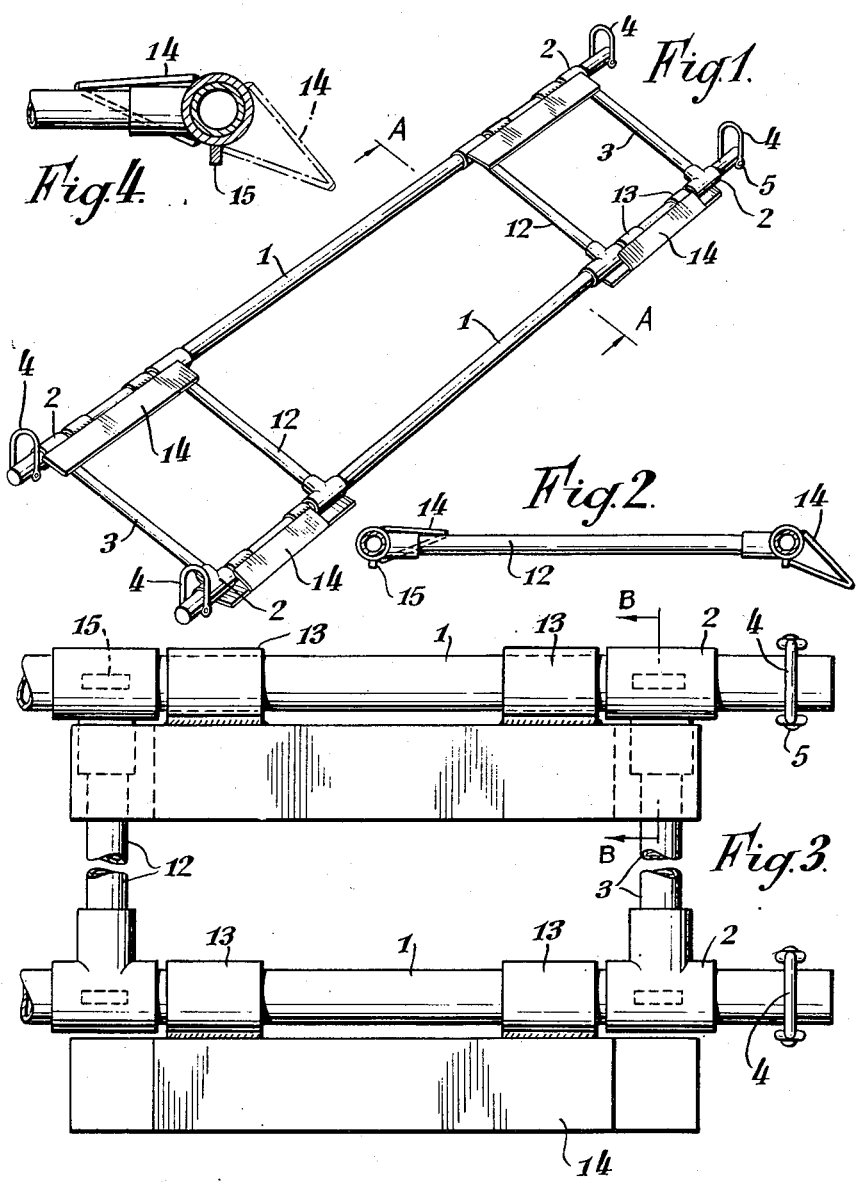
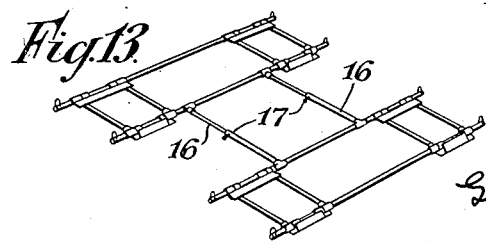

Patented Apr. 22, 1952

2,593,664

UNITED STATES PATENT OFFICE 2,593,664

APPARATUS FOR LIFTING AND TRANSPORTING WHEELED VEHICLES

George Frederick Fearfield, Eltham, London, and Sydney Parsons, Horley, England, assignors to Furness Withy & Company Limited, London, England, a British company Application December 21, 1949, Serial No. 134,162
In Great Britain November 15, 1948

4 Claims. (Cl. 294—67)

The invention relates to apparatus for lifting and transporting wheeled vehicles such as motor cars, and is particularly applicable for loading such vehicles on to ships, and for unloading them from ships.

It is common practice in such loading and unloading operations to use a net made of steel cable or the like, which with the present-day tendency of vehicle body design to provide wide wings in relation to the chassis leads to damage to the vehicle bodywork.

The invention has among its objects to avoid the disadvantages above referred to, and to provide lifting apparatus which serves to raise the vehicle without danger of damage to the bodywork by contact between parts of the lifting apparatus and the vehicle, and which is adapted at the same time for use with vehicles having wheels or tires of different diameters.

According to the invention, apparatus for lifting and transporting wheeled vehicles, as for example, when loading cars on ships, or when unloading them from ships, comprises a pair of frame members advantageously of rectangular form, adapted to fit respectively beneath the front and rear pairs of wheels of the vehicle, and to be connected for example at the laterally projecting ends, to the crane or other power driven lifting means, by steel cable, rope or the like, and means mounted on the frame members for supporting vehicle wheels or tires of different sizes or diameter whereby the vehicle is held in stable equilibrium on the frame of the lifting apparatus during the lifting or lowering operation, the means for supporting the wheels or tires of different sizes or diameter comprising supporting members pivoted or rotatable on the longitudinal members of the frames, one or both pairs of which members on each frame in the position of use being rotatable to project inwardly of the frame to rest on transverse frame members in the manner of flaps, so that each wheel of the vehicle on each frame rests on the inner edges of the longitudinal supporting members between two of the transverse frame members.

According to the invention furthermore, the means for supporting wheels or tires of different diameter may be formed as two or more cylindrical sections of tube to surround the longitudinal members of the frame on which they are rotatable, and connected together by a length of metal or tapered or wedge section to form a flap whereby when directed to lie inwardly, the flaps rest on the transverse frame members and when directed to lie outwardly of the frame they serve as a ramp for the wheeled vehicle to be lifted.

To prevent the tapered or wedge sections of metal coming to lie beneath the frame and thus being damaged when the apparatus is lowered into position for the removal of the vehicle, stops may be provided on the longitudinal members projecting downwardly and engaging with the lower edges of the metal lengths of tapered section at positions between the cylindrical sections of tube.

The invention further comprises the features of construction hereinafter described.

The invention is diagrammatically illustrated by way of example in the accompanying drawings, in which:

Figure 1 is a perspective view of the apparatus from above.

Figure 2 is a transverse section on the line A—A of Figure 1.

Figure 3 is a plan view on an enlarged scale of a part of the apparatus,

Figure 4 is a transverse section on the line B—B of Figure 3,

Figure 5:
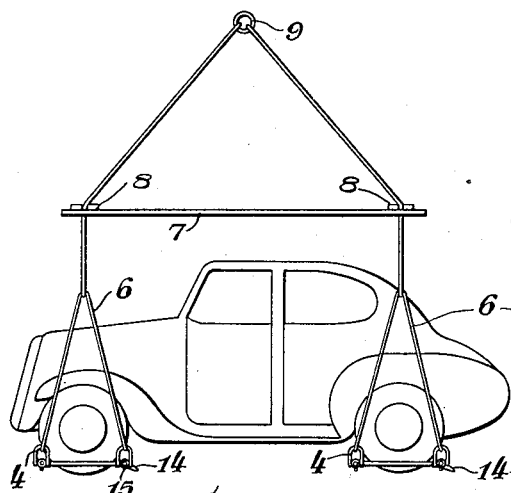
Figure 6:
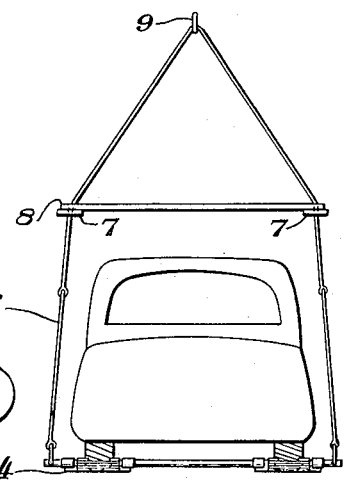
Figure 8:
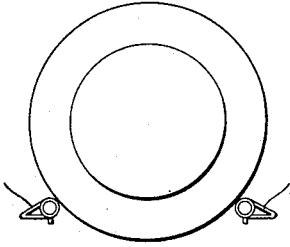
Figure 9:
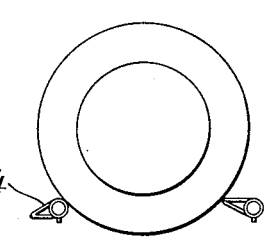
Figure 10:
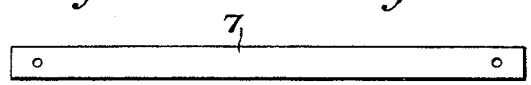
Figure 11:
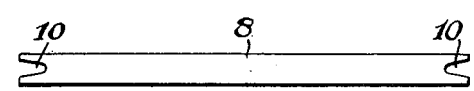
Figure 12:
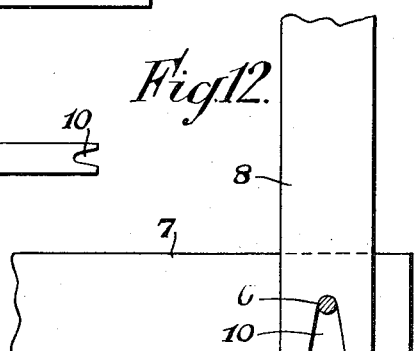

Figure 5 shows on a reduced scale in front elevation the apparatus as applied to a motor car, Figure 6 is an end elevation corresponding to Figure 5, Figures 7, 8 and 9 show wheels of different diameter supported on the apparatus, Figures 10 and 11 are side elevations of spreader members, Figure 12 shows on an enlarged scale how the spreader members engage when in the position of use, and Figure 13 is a diagrammatic representation of a modification.

In carrying the invention into effect according to one construction, given by way of example only, the frame members may be formed of pairs of parallel longitudinal members 1 formed of cold drawn steel tube of 1¾" x $\tfrac{3}{16}$", or 1¾" x ¼", or 1¾" x $\tfrac{5}{16}$" and of a length of from 6'9" to 7'6" or more or less, and connected at the ends through internally screw-threaded elbow joints 2 with tubular end members 3 formed as 1¾" diameter steam pipe of lengths of 2', or more or less.

At each of the corners are secured shackles 4, secured to the ends of the longitudinal members 1 by coupling links 5. To the shackles 4 are connected the reinforced ends of rope or wire cable 6 or the like, which may, where the vehicle is of a width to require it, be held apart in known manner at positions greater than the height of the vehicle body by a rectangular frame of wooden "spreader" members 7, 8. The ends of the rope or cable 6 are connected together at the ends as by a ring 9 or in any other suitable manner, to the rope or cable of the crane or the like, through the operation of which the vehicle is lifted.

If ropes are used to support the ends of each longitudinal member they may be whipped and tucked at the ends from the connection of four single ropes to the ring 9, the longitudinal spreader 7 being supported by the single ropes passing through holes in the ends of the spreaders 7 and supported by tucks in the splice. The lateral spreaders 8 are notched at each end at 10 to engage the single ropes at positions above the longitudinal spreaders 7.

At positions near the ends of each of the longitudinal members 1, for example at a distance of 6" from each end member, is secured, as by welding, a transverse tubular member 3 formed as a 1¼" diameter steam pipe, each transverse member 3 having disposed adjacent a similarly mounted parallel transverse member 12 at a distance of for example 1'3" from the member 3.

Figure 7:
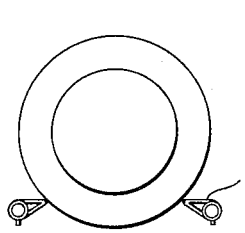

Mounted between the transverse members 3 and 12 and rotatable on the lengths of longitudinal members 1 between the transverse members 3, 12, are the wheel or tire size adjusting members. These members are formed as sections 13 of tube rotatable on the longitudinal members 1 and joined by laterally extending metal members 14 of triangular section, the adjacent ends of the members 14 engaging on each side of the sections of tube 13 to form tapered flaps. The members 14 are adapted to be rotated to lie with the underfaces of the ends of the members 14 supported on the transverse members 11 and 12, or with both members 14 inwardly directed to lie on the members 3, 12 or with both members 14 outwardly directed, depending upon the diameter of the wheel or tire of the vehicle to be supported as illustrated in Figures 7, 8 and 9.

Formed integral with the longitudinal members 1 at positions between the cylindrical members 13 and underneath the longitudinal members are stops 15 which engage the edges of the members 13 to prevent the rotation of the members 13 except in a plane above the horizontal plane of the frame.

Thus it will be understood that with all the members 13 inwardly directed a wheel or tire of the smallest diameter may be supported (Figure 7); with the members 13 on one side only inwardly directed, and on the other side outwardly directed (Figure 9), a medium-sized wheel or tire may be supported, and with all the members 13 outwardly directed a large wheel or tire (Figure 8).

Furthermore, the members 13 when outwardly directed serve as ramps for running the vehicle into position on the lifting apparatus.

In a modified construction, the shackles 4 of each longitudinal frame member may be substituted by eyes.

Instead of the stops 15, one side of each member 14 may be extended beyond the position of connection to the longitudinal frame members to serve as a stop.

The frame members for the support of each pair of wheels of a vehicle such as a motor car may be connected together (Figure 13) as for example by two or more rods 16 to form a single frame-work, the connecting rods being provided to be adjustable in length as at 17 in accordance with the length of the wheel base of the car being loaded or unloaded.

We claim:

1. Apparatus for loading on and unloading wheeled vehicles having four or more wheels such as automobiles, comprising a pair of longitudinal frame members of a length corresponding to the width of the vehicle to be loaded-on or off, a sling to which the longitudinal frame members are connected, pairs of transverse frame members secured near the ends of each of the longitudinal frame members to maintain the longitudinal frame members in fixed spaced relation at a distance corresponding to the average diameter of the wheels or tires of the vehicles to be loaded on or off, and plate members mounted to rotate on the ends of each longitudinal frame member so as to adjust the spaces between the longitudinal frame members in accordance with the wheel or tire diameter of the vehicle being loaded by rotating the plate members to bring the ends of one or both pairs of plate members as may be required into position to rest on the transverse frame members.

2. Apparatus according to claim 1, in which the plate members are provided with stops for the purpose of preventing rotation of the plate members below the horizontal plane of the frame as a whole.

3. Apparatus according to claim 1, in which the plate members are formed to a V-section tapering outwardly from the longitudinal frame members on which they are mounted to serve as a ramp.

4. Apparatus according to claim 1, including spreader members connected together and engaging the ropes or cables of the sling to maintain them out of contact with the sides of the vehicle being loaded on or off.

GEORGE FREDERICK FEARFIELD.
SYDNEY PARSONS.

REFERENCES CITED

The following references are of record in the file of this patent:

UNITED STATES PATENTS

| Number | Name | Date |
|---|---|---|
| 1,802,886 | Ellison | Apr. 28, 1931 |
| 2,020,174 | Derossi | Nov. 5, 1935 |

FOREIGN PATENTS

| Number | Country | Date |
|---|---|---|
| 388,206 | Great Britain | Feb. 23, 1933 |